United States Patent [19]

Sakagami et al.

[11] Patent Number: 4,615,943

[45] Date of Patent: Oct. 7, 1986

[54] VINYLIDENE FLUORIDE COPOLYMER FILM

[75] Inventors: Teruo Sakagami; Noriyuki Arakawa; Naohiro Murayama, all of Iwaki, Japan

[73] Assignee: Kureha Kagaku Kogyo Kabushiki Kaisha, Tokyo, Japan

[21] Appl. No.: 810,905

[22] Filed: Dec. 20, 1985

Related U.S. Application Data

[63] Continuation-in-part of Ser. No. 640,596, Aug. 14, 1984, abandoned.

[30] Foreign Application Priority Data

Aug. 15, 1983 [JP] Japan ................................ 58-148019

[51] Int. Cl.[4] ...................... B32B 27/00; B32B 15/00; C08F 29/16
[52] U.S. Cl. .................................... 428/332; 428/333; 428/421; 428/422; 526/255; 526/249; 427/385.5; 264/216
[58] Field of Search ................................ 526/255, 249; 427/385.5; 264/216

[56] References Cited

U.S. PATENT DOCUMENTS 4,335,238  6/1982  Moore ................................ 428/421
4,435,475  3/1984  Sasaki et al. ....................... 428/421

FOREIGN PATENT DOCUMENTS 1173552  12/1969  United Kingdom .

*Primary Examiner*—P. C. Ives
*Attorney, Agent, or Firm*—Wenderoth, Lind & Ponack

[57] ABSTRACT

A transparent film of a vinylidene fluoride copolymer, comprising a dry film of a vinylidene fluoride copolymer having a parallel light transmittance of 85% or higher at a film thickness of 30 microns. The transparent film is obtained by forming a mixture of a vinylidene fluoride copolymer having a specifically high molecular weight with a solvent into a film, preferably by casting, and evaporating off the solvent.

15 Claims, No Drawings

VINYLIDENE FLUORIDE COPOLYMER FILM

This application is a continuation-in-part of now abandoned application Ser. No. 640,596 filed Aug. 14, 1984.

BACKGROUND OF THE INVENTION

This invention relates to a vinylidene fluoride copolymer film, more particularly, to a film of a vinylidene fluoride copolymer (hereinafter frequently referred to as "VDF copolymer") to which transparency is imparted by film formation at normal temperature or around normal temperature and a process for producing the same.

Vinylidene fluoride resins (hereinafter frequently referred to as "VDF resins"), typically, polyvinylidene fluoride (hereinafter referred to as "PVDF"), are excellent in weathering resistance, staining resistance, water resistance, etc. and they are known to be useful as a material of film by itself or a coating of a film product. However, there has been an obstacle to wide utilization of the VDF resin film, that is, the difficulty in forming a transparent homogeneous film. For example, among various methods proposed concerning application of coating on a shaped body, Japanese Patent Publication No. 4176/1963 discloses a method wherein a PVDF solution is applied on a shaped body, then dried first at a high temperature of 100° to 150° C. and further heated to a temperature of the melting point of the PVDF or higher to form a transparent film. Such a high temperature drying is carried out because, in the case of mere drying at normal temperature, the coating obtained is under a state of merely pressure bonded powder, which is opaque in white and fragile and can hardly be called a film. However, when considering application for uses requiring excellent characteristics such as weathering resistance, etc. of VDF resin films, for example, coatings on already built structures such as bridges, towers, etc., or large scale equipments, including transportation means such as ship, vehicles, etc., the necessity of application at such a high temperature has markedly impeded utilization of VDF resin films.

Accordingly, in order to obtain a homogeneous and transparent VDF resin film by film formation at around normal temperature, various proposals have been made. One typical method is disclosed by Japanese Patent Publicaion No. 14536/1971. According to this method, VDF resin is formed into a film by casting or others, on the basis of a discovery that existence of both α-phase and β-phase crystals in a mixture gives a transparent film, as contrasted with the β-phase crystal of VDF resin, which is rapidly crystallized to form spherulites thus tending to give a film with turbidity over the whole surface. On the other hand, with the change in composition from PVDF to a VDF copolymer, the crystal form is shifted to β-phase and therefore, in this method, PVDF homopolymer or a VDF copolymer containing 95% or more of vinylidene fluoride is employed. Also, even if such a polymer may be employed, at a critical temperature determined depending on the kind of the solvent or a higher temperature, due to solvation action, the crystal form will be shifted to the β-phase which can readily be solvated. For this reason, it has been required to dissolve the polymer in a solvent at a temperature lower than the critical temperature followed by casting. The critical temperature is, for example, about 40° C., when dimethylacetamide is employed as the solvent, while it is about 70° C. when dimethylformamide is employed. However, restriction to a lower temperature than the relatively low critical temperature in forming a solution as mentioned above leads to use of the solvent under the conditions where its solvent ability cannot effectively be utilized. This cannot always be advantageous in view of a film forming step. Also, even in a solution prepared at a temperature lower than the critical temperature, when maintained under the state as prepared for a long time, transition to the β-phase structure which is readily solvated will progress to give also only intransparent films. Because of these reasons, this method of the prior art involves a drawback that it is difficult to obtain transparent films of constant quality.

Further, U.S. Pat. No. 4,335,238 to Moore et al. discloses a terpolymer consisting of 30–81% by weight of vinylidene fluoride, 12–48% by weight of tetrafluoroethylene and 7–24% by weight of hexafluoropropylene. This terpolymer provides a transparent film when formed around room temperature. However, such a copolymer having a relatively large content of a branched monomer such as hexafluoropropylene shows an elastic nature because a large space occupied by the side branch hinders the crystallization of the polymer. While the polymer having substantially no crystallinity can be transparent, the softening point of the polymer becomes 130° C. or below, whereby an isolated film or a coating film thereof cannot be applied to outdoor use because it becomes too soft and is liable to cause deformation when irradiated by the sunlight.

SUMMARY OF THE INVENTION

A principal object of the present invention is to provide a stable and transparent VDF resin film which can be formed at a relatively low temperature, i.e., at or around normal temperature without losing various characteristics, inclusive of heat resistance.

We have studied about a series of VDF resins, in connection with the above object and consequently found that, when a PVDF with a high molecular weight is formed into a film by the solvent casting method, the molecular chains are oriented in parallel to the film surface to give a film which is high in so called surface orientation and dielectric constant (Japanese Patent Application No. 214249/1982). At the same time, as a result of further studies with a viewpoint of the relatively good transparency possessed by this film, as a knowledge contrary to the technique for obtaining a transparent PVDF film as described above, it has been also found that a film excellent in transparency can be obtained substantially without occurrence of spherulites for a VDF copolymer enriched in the β-phase structure in the case of obtaining a film according to a method involving solvent evaporation from a coating of a solution thereof such as casting, provided that the VDF copolymer has a molecular weight of a specific value or higher, probably because of alignment with entaglement of the molecular chains in parallel with the film surface. The vinylidene fluoride copolymer film of the present invention is based on such a finding. The invention is characterized by a crystalline vinylidine fluoride copolymer film having a parallel light transmittance of 85% or higher when measured at a film thickness of 30 microns and a coefficient of absorption of $2.35 \times 10^3$/m or below according to Lambert's law for determining a parallel light transmittance for variable film thickness, and wherein the vinylidene fluoride copolymer film is a film of a vinylidene fluoride copolymer obtained from a mixture of the vinylidene fluoride copolymer with a solvent, said copolymer having an inherent viscosity of 3.0 dl/g or higher, measured as a solution dissolved in a solvent with a greater solubility selected from dimethylacetamide and dimethylformamide at a concentration of 0.4 g/dl and a temperature of 30° C., and consisting essentially of the β-phase crystalline structure.

According to another aspect of the invention, there is provided a process for producing the above-mentioned vinylidene fluoride copolymer film.

DETAILED DESCRIPTION OF THE INVENTION

The VDF copolymer to be used in the present invention has a high molecular weight and, as previously defined, has an inherent viscosity of 3.0 g/dl or higher, measured as a solution dissolved in a solvent with a greater solubility selected from dimethylacetamide or dimethylformamide at a concentration of 0.4 g/dl and a temperature of 30° C. (hereinafter merely referred to as "inherent viscosity" or "$\eta_{inh}$" by omitting the measurement conditions). The transparency tends to increase as the molecular weight is higher. On the other hand, although a higher polymerization degree has no problem with respect to the physical properties of the film such as transparency, it will lower the solubility of the polymer in a solvent. For this reason, in the formation of a film through evaporation from a solution in a solvent, the resin concentration in the solution must be lowered considerably, whereby it becomes disadvantageous in practical application. Thus, it is preferred to use a copolymer having an inherent viscosity of not higher than 10 dl/g, more preferably not higher than 9 dl/g, particularly preferably not higher than 8 dl/g.

In the present invention, a VDF copolymer is employed, which is such a high polymer and has a crystalline structure consisting essentially of the β-phase crystals (form I). Herein, the expression "consisting essentially of the β-phase crystals" means that the amount of the α-phase crystals is less than 10%, preferably 5% or less, as compared with the β-phase crystals. When containing such an extent of the β-phase crystals, transparent films can be obtained under substantially stable state. In the present invention, "β-phase crystal" is used to mean a crystal structure exhibiting substantially planar zig-zag structure as contrasted to the α-phase structure (form II). Accordingly, it is meant to include the γ-phase crystal (form III) in addition to the β-phase crystals (form I) in a strict sense.

The VDF copolymer mentioned in the present invention refers to a copolymer containing 30 mole % or more of vinylidene fluoride. If the content of vinylidene fluoride is higher than 95 mole %, the copolymer tends to take the α-phase structure, and therefore a copolymer of 30 to 95 mole % of vinylidene fluoride with at least one monomer copolymerization with vinylidene fluoride is used.

More specifically, if the constitution units of vinylidene fluoride are too large in amount so that the composition is approximate to that of the homopolymer, the transparency tends to be lowered, whereas, if they are too small in amount, no suitable solvent is present or, if any, either one of the inherent properties of vinylidene fluoride homopolymer such as weathering resistance, staining resistance, water resistance, etc. will undesirably be lowered. The vinylidene fluoride content should preferably be 40 to 95 mole %, more preferably 50 to 90 mole %, particularly 60 to 85 mole %. Examples of the monomer copolymerizable with vinylidene fluoride may include vinyl fluoride, trifluoroethylene, trifluorochloroethylene, tetrafluoroethylene, hexafluoropropylene, ethylene and the like.

A characteristic feature of the present invention is that the VDF copolymer has a crystalline melting point of 140° C. or higher. Herein, the "crystalline melting temperature" is defined as a temperature giving a main peak in a heat absorption curve when the copolymer is heated in a DSC (differential scanning calorimeter) at a temperature raising rate of 4° C./min. In order to obtain such a property, the kinds and amounts of comonomers to be copolymerized with vinylidene fluoride are naturally restricted, and it is unsuitable to use a comonomer having a large functional branch group such as hexafluoropropylene having a branch group of trifluoromethyl in a large amount since such a comonomer hinders crystallization and lowers the crystalline melting temperature of the resultant VDF copolymer. Most preferably, such comonomer having a large functional branch group as hexafluoropropylene should not be used.

In the present invention, crosslinked VDF copolymers are not suitable. This is because the film obtained therefrom is poor in transparency, which may be attributable to the fact that a crosslinked VDF copolymer can not readily be reoriented during film formation through solvent evaporation from a coating of a mixture thereof with a solvent. With regard to the preparation method, a VDF copolymer polymerized at a high temperature generates branched and thermally crosslinked structures and therefore undesirable, for the same reason as mentioned above, but not to such an extent as the above crosslinked VDF copolymer. Accordingly, it is preferred to use a VDF copolymer obtained by polymerization at a temperature of −50° to 80° C.

The above VDF copolymer can be also used in the form of a composition with other polymers or additives such as UV-absorbers, antioxidants, pigments, etc., containing the copolymer in an amount of 80% by weight or more.

Examples of the polymers which can be mixed with the vinylidene fluoride copolymer may include homopolymers or copolymers containing the monomer constituting the above vinylidene fluoride copolymer or a monomer copolymerizable with vinylidene fluoride as constituent units, and polymethyl methacrylate, polyethyl acrylate, polycarbonate, polyethylene terephthalate and others.

The film of the present invention can be obtained by mixing the VDF copolymer, including the above composition form, with a solvent and applying the resultant liquid mixture in the form of a gel or a solution on a substrate, followed by film formation by drying of the solvent. As the solvent, any solvent can be used, which is capable of forming the VDF copolymer into a solution or gel state. For example, it is preferable to use a polar organic solvent such as dimethylacetamide, dimethylformamide, methyl ethyl ketone, dimethyl sulfoxide, cyclohexanone, acetone, etc. For formation of the mixture with solvent, it is preferred to use a temperature of the critical temperature or higher as mentioned in Japanese Patent Publication No. 14536/1971, also in the sense for promoting conversion of the structure to the β-phase. This is because such a temperature can easily afford a mixture with a solvent suitable for coating. However, in the present invention, it is not essentially required to employ a temperature of the critical temperature or higher, since the starting material VDF copolymer itself generally contains substantially no α-phase structure.

The resin concentration in the mixture with solvent may be such that the mixture is at least plasticized in a gel state to an extent necessary for formation of a coating or a film. Such a gelled product can be formed into a transparent film by extruding in shape of a sheet or a film on a substrate, followed by drying. This is because, since the VDF copolymer to be used in the present invention has a high molecular weight, opaqueness with white turbidity through formation of spherulites can be prevented. More preferably, however, there may be employed a method in which a coating film is formed by casting, brush coating, etc. with a solution of a relatively low concentration. As the concentration is made lower, the planar orientation of the VDF copolymer molecular chains is improved to give a film with correspondingly better transparency. When the solution concentration is low, however, the amount of the solvent evaporated for obtaining a film with the same thickness is increased. Therefore, it is practically suitable to use a concentration of 0.3 to 20% by weight, particularly 0.5 to 10% by weight, which may be also selected suitably depending on the polymerization degree.

In evaporation of the solvent, it is practical to employ a normal temperature or a temperature around normal temperature, for example, 50° C. or lower, but it is also possible to effect the evaporation at a somewhat higher temperature without causing any trouble in formation per se of a transparent film. Evaporation may be feasible either under reduced pressure or atmospheric pressure.

The VDF copolymer film of the present invention thus prepared can be also used as such as a transparent coating film. However, if desired, the film can be peeled off from the substrate and used as an isolated or independent transparent film. For obtaining such an isolated film, the substrate employed may preferably be of, for example, a seamless strainless steel or a rotary drum having a mirror surface.

The thus prepared VDF copolymer film of the present invention has a transparency of 85% or higher, normally 87% or higher in terms of a parallel light transmittance when measured at a film thickness of 30 microns according to JIS K6714 - 1977, for example by using a parallel light transmittance meter available under the trade name of HAZE METER TC-H III from Tokyo Denshoku K.K. The parallel light transmittance for a film having a thickness other than 30 microns can be determined according to Lambert's law expressed by the following equation:

$$\log_{10}(I_o/I) = aXd.$$

wherein $I_o$ is the intensity of a control light, I is the intensity of a light transmitted through a sample film, $I/I_o$ is a parallel light transmittance, $a$ is a coefficient of absorption, and d is the thickness of a sample film. The VDF copolymer film of the present invention can also be characterized by having a coefficient of absorption $a$ of $2.35 \times 10^3$/m or below.

As described above, according to the present invention, by use of a VDF copolymer having a specifically high molecular weight, a transparent VDF copolymer film capable of film formation under reasonable conditions with little restriction can be provided.

The present invention is further illustrated by referring to the following Example and Comparative Examples.

EXAMPLE 1

Into a stainless steel autoclave equipped with a stirrer, an aqueous solution containing methyl cellulose as the suspending agent was charged and, after cooling down to 5° C., a polymerization initiator of n-propylperoxydicarbonate and other polymerization aids were added. After replacement with nitrogen, the mixture was well stirred. Then, the autoclave was cooled externally with a methanol-dry ice system, and vinylidene fluoride and tetrafluoroethylene were pressurized from the bombs into the autoclave in a molar ratio of 75% and 25%, respectively. Subsequently, the inner temperature of the autoclave was elevated to initiate polymerization, and the external temperture of the autoclave was maintained at about 20° C. to continue polymerization. The pressure at the initial stage of polymerization was 36 kg/cm$^2$, with pressure drop being observed with lapse of time finally to the stage of about 13.2 kg/cm$^2$, whereupon the residual pressure was purged to complete polymerization. As the result, white powder was obtained. The powder was thoroughly washed with water and dried to obtain a binary copolymer powder having substantially the same composition as charged. This copolymer had an $\eta_{inh}$ of 6.2 dl/g as measured as a dimethylformamide solution at a concentration of 0.4 g/dl at 30° C. The powder was dissolved in dimethylformamide at 60° C. to form a 3% solution and the solution was applied on a glass plate, left to stand at 35° C. for one day to form a film. The film with a thickness of 30 microns thus obtained had a transparent appearance and was not fragile at all. The parallel light transmittance was 90% with the haze being 2% (measured by HAZE METER TC-H III produced by Tokyo Denshoku K.K.). When the dimethylformamide solution of the copolymer, after 1 month of storage under sealing, was used to form a film in the above manner, the resultant film had quite the same transparency. Substantially no absorption at 530 cm$^{-1}$ attributable to the α-phase crystal was observed in IR-absorption spectrum, indicating that the crystal structure was substantially of the β-phase. The crystalline melting point was 145° C.

COMPARATIVE EXAMPLE 1

A vinylidene fluoride homopolymer with an $\eta_{inh}$ of 1.0 dl/g was applied on a glass plate in the same manner as in Example 1. Even when dried under an atmospheric temperture of 60° C., the resultant coating was opaque in white with a thickness of 30 microns, fragile and could hardly be called film. Thus, measurement of transparency was impossible.

COMPARATIVE EXAMPLE 2

A cast film was prepared from a solution of a copolymer comprising 75 mole % of vinylidene fluoride and 25 mole % of tetrafluoroethylene (no presence of the α-phase crystal recognized by X-ray powder diffraction, indicating substantially the β-phase crystal) having an $\eta_{inh}$ of 1.2 dl/g in dimethylformamide under the same conditions as in Example 1 (left to stand at 35° C. for one day). Although having a shape of a film, the parallel light transmittance was 83% at a thickness of 30 microns, the haze being about 9%.

EXAMPLE 2

A 3% solution of a binary copolymer containing 75 mole % of vinylidene fluoride and 25 mole % of trifluoroethylene having an $\eta_{inh}$ of 5.9 dl/g in dimethylformamide (dissolved at 60° C.) was prepared and applied on a glass plate. After left to stand under atmospheric temperature of 30° C. for one day, a very transparent film with a thickness of 32 microns (parallel light transmittance: 92%, haze: 1.4%) was found to be formed. This film was examined by IR-absorption spectrum to find that the crystal structure was of the $\beta$-phase crystal without absorption of the $\alpha$-phase crystal recognized at 530 cm$^{-1}$.

The crystalline melting point of the copolymer film sample was 145° C. Further, when the solution of the copolymer, after 1 month of storage under sealing, was used to form a film in the above manner, the resultant film showed quite the same transparency.

EXAMPLE 3

A 3% solution of a binary copolymer containing 60 mole % of vinylidene fluoride and 40 mol % of tetrafluoroethylene having an $\eta_{inh}$ of 5.1 dl/g in dimethylacetamide (dissolved at 60° C.) was prepared and applied on a glass plate. Hot air of 30° to 35° C. was passed over the coating, and a transparent film was obtained 30 minutes later. The film had a thickness of 10 microns and exhibited a parallel light transmittance of 90% and a haze of 2.5%.

When the solution of the copolymer, after 1 month of storage under sealing, was used to form a film in the above manner, the resultant film showed quite the same transparency.

No absorption was observed at 530 cm$^{-1}$ in the IR-absorption spectrum, and the crystal was found to be of the $\beta$-phase. The crystalline melting point was 169° C.

What is claimed is:

1. A crystalline vinylidene fluoride copolymer film, having a parallel light transmittance of 85% or higher when measured at a film thickness of 30 microns and a coefficient of absorption of $2.35 \times 10^3$/m or below according to Lambert's law for determining a parallel light transmittance for variable film thickness; said vinylidene fluoride copolymer film being a film of a vinylidene fluoride copolymer having a crystalline melting point of 140° C. or higher obtained from a mixture of the vinylidene fluoride copolymer with a solvent, said copolymer having an inherent viscosity of 3.0 dl/g or higher, when measured as a solution dissolved in a solvent with a greater solubility selected from dimethylacetamide and dimethylformamide at a concentration of 0.4 g/dl and a temperature of 30° C., and consisting essentially of the $\beta$-phase crystalline structure.

2. A vinylidene fluoride copolymer film as claimed in claim 1, wherein said vinylidene fluoride copolymer is non-crosslinked.

3. A vinylidene fluoride copolymer as claimed in claim 1, wherein said vinylidene fluoride copolymer film has been obtained by polymerization at −50° to 80° C.

4. A vinylidene fluoride copolymer film as claimed in claim 1, wherein said copolymer comprises 30 to 95 mole % of vinylidene fluoride and the remainder of a monomer copolymerizable with vinylidene fluoride.

5. A vinylidene fluoride copolymer film as claimed in claim 1, wherein said copolymer comprises 50 to 90 mole % of vinylidene fluoride and the remainder of a monomer copolymerizable with vinylidene fluoride.

6. A vinylidene fluoride copolymer film as claimed in claim 4, wherein said monomer copolymerizable with vinylidene fluoride is selected from the group consisting of vinyl fluoride, trifluoroethylene, trifluorochloroethylene, tetrafluoroethylene, and ethylene.

7. A vinylidene fluoride copolymer film as claimed in claim 1, which has a parallel light transmittance of 87% or higher at a film thickness of 30 microns.

8. A vinylidene fluoride copolymer film as claimed in claim 1, which is in the form of an isolated film independent of a substrate.

9. A vinylidene fluoride copolymer film as claimed in claim 1, which is in the form of a coating.

10. A vinylidene fluoride copolymer film as claimed in claim 1, which is a cast film.

11. A process for producing a vinylidene fluoride copolymer film, which comprises the steps of: providing a vinylidene fluoride copolymer having an inherent viscosity of 3.0 dl/g or higher, when measured as a solution dissolved in a solvent with a greater solubility selected from dimethylacetamide and dimethylformamide at a concentration of 0.4 g/dl and a temperature of 30° C. and consisting essentially of the $\beta$-phase crystalline structure, mixing said vinylidene fluoride copolymer with a polar solvent, forming the resultant mixture in a film on a substrate, and evaporating off the solvent to form a dry film of the vinylidene fluoride copolymer.

12. A process for producing a vinylidene fluoride copolymer film as claimed in claim 11, wherein said polar solvent is selected from the group consisting of dimethylacetamide, dimethylformamide, methyl ethyl ketone, dimethyl sulfoxide, cyclohexanone and acetone.

13. A process for producing a vinylidene fluoride copolymer film as claimed in claim 11, wherein the mixture is formed into a film by casting.

14. A process for producing a vinylidene fluoride copolymer film as claimed in claim 13, wherein the mixture contains the vinylidene fluoride copolymer at a concentration of 0.3 to 20% by weight.

15. A process for producing a vinylidene fluoride copolymer film as claimed in claim 11, wherein said vinylidene copolymer is a non-crosslinked polymer formed by polymerization at a temperature of −50° to 80° C.

* * * * *